Sept. 16, 1930.   J. R. MAHAN   1,775,729
STUFFING BOX
Filed June 25, 1927
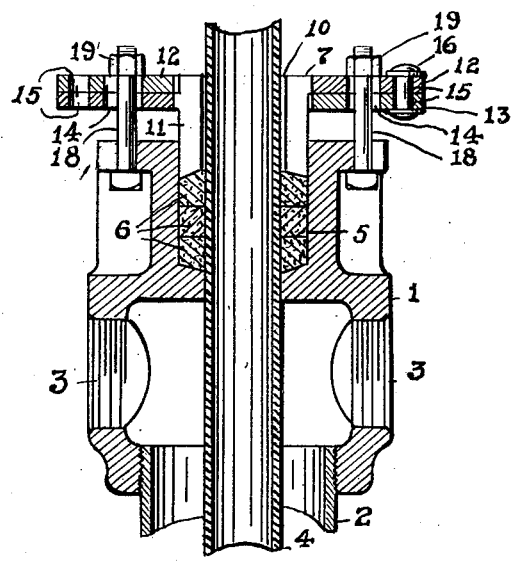
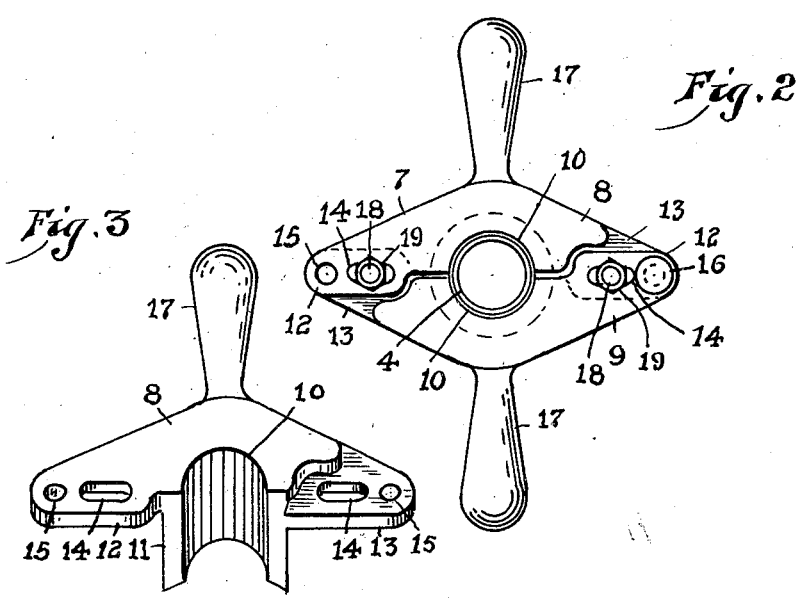
INVENTOR
BY J. R. Mahan
F. N. Barber
ATTORNEY.

Patented Sept. 16, 1930

1,775,729

UNITED STATES PATENT OFFICE

JOSEPH R. MAHAN, OF TOLEDO, OHIO, ASSIGNOR TO THE NATIONAL SUPPLY COMPANY, OF TOLEDO, OHIO, A CORPORATION OF OHIO

STUFFING BOX

Application filed June 25, 1927. Serial No. 201,425.

My invention relates to stuffing boxes and has special reference to those used with casing heads, though it may be applied to various other devices.

In case of a premature or unsuspected blow of gas or oil from a well it is found necessary to pack off the space between the tubing and the casing quickly in order to avoid caves or other difficulties resulting from a sudden relief of pressure in the well hole. It is one object of this invention to provide a stuffing box whereby the space between the tubing and the casing may be very quickly and efficiently packed off.

Another object is to provide for the stuffing box a pair of hinged gland members which may be readily assembled around the tubing in position to be drawn down upon packing rings placed between the tubing and the stuffing box wall.

Another object is to provide the gland members with handles whereby the members may be more readily applied.

Another object is to construct the gland of two exactly similar parts so that only a single pattern is needed and so that any two of the gland members may be assembled into a complete gland. Other objects appear hereinafter.

Referring to the accompanying drawing, Fig. 1 is a central vertical section of a casing head provided with a casing, a tube, a packing, and a gland constructed according to my invention; Fig. 2, a plan view of my improved gland; and Fig. 3, a perspective view of one of the gland members.

On the drawing 1 designates a casing head provided with the well casing 2 and the lateral ports 3. 4 is the well tubing extending down centrally through the casing head and casing and through the stuffing box 5 at the upper end of the casing head. A number of packing rings 6 are placed in the stuffing box between the tubing 4 and the lateral wall of the stuffing box 5. 7 is my improved gland having its central tubular portion resting upon the upper packing ring 6.

The gland 7 is composed of two members 8 and 9, each having a semicircular opening 10 to receive the tubing 4 and a depending semicylindrical gland member 11. Each gland member has at diametrically opposite points the ears 12 and 13, each preferably being half as thick as the body of the member between the two ears. One of the ears, as 12, is flush with the upper face of the body of the gland member, while the other ear, as 13, is flush with the bottom face of the body. The vertical edges of the pendent gland member preferably lie in a plane including the axial center of the opening 10. The ears 12 and 13 project from the body somewhat beyond the said plane.

The two gland members 8 and 9 are assembled wth the vertical edges of their pendent members directly opposite each other so as to form a substantially circular member surrounding the tubing 4. When the gland members are so assembled the ear 12 of each member overlaps the ear 13 of the other member. When the gland members are so assembled the elongated holes 14 at each end of each gland member register with similar holes in the other gland member. The outer end of each ear on each gland member is provided with a hole 15 so arranged that when the gland members are assembled the holes at the ends of the ears will be in registry. One registering pair of these holes is provided with the pivot 16 provided with any suitable means for preventing its accidental escape.

The body of each gland member 8 and 9 is provided with a handle 17 extending out at right angles to the axis of the gland member 11 and situated midway between the ears on the said body.

When the gland is to be assembled with the casing head the packing rings 6 are placed in the stuffing box and the gland 7 is seized by the handles 17 by which the gland members are readily assembled around the tubing 4 with the members 11 resting on the upper packing ring. Bolts 18 are extended up through openings in the stuffing box and through the registering openings 14 in the said ears, nuts 19 on the bolts being screwed down on the upper faces of the gland.

By making the gland in two parts exactly alike the manufacture and the assemblage of the gland is considerably facilitated. Any two gland members 8 and 9 can be assembled into a single gland, which would not be the case where the gland members were what might be called rights and lefts. By pivoting the two gland members together the parts are always assembled ready for use in case of emergency, and in all cases their application to the stuffing box is facilitated. By having the pivot opening 15 at each end of each ear the pivot can be applied to either pair of ears which are first in better position for applying the pivot. Also if one pair of ears should be broken another pair would be available for applying the pivot thereto.

I claim—

1. For a stuffing box, a gland composed of duplicate members, a pivot connecting the members together at one side thereof, and lying parallel with the axial center of the stuffing box, there being registrable openings in the members at the opposite sides thereof for a pivot and means cooperating between the stuffing box and the gland for forcing the gland toward the bottom of the stuffing box.

2. For a stuffing box, a gland composed of duplicate members hinged together, and lying parallel with the axial center of the stuffing box, there being additionally provided at opposite sides of the members registering openings for bolts for securing the gland to a stuffing box body.

3. For a stuffing box, a gland composed of duplicate members, a pivot connecting the members together at one side thereof, and lying parallel with the axial center of the stuffing box, there being additionally provided registrable openings in the members at the opposite sides thereof for a pivot and there being additionally provided at opposite sides of the members registering openings for bolts for securing the gland to a stuffing box body.

In testimony whereof, I hereunto affix my signature.

JOSEPH R. MAHAN.